United States Patent [19]
Overall et al.

[11] Patent Number: 5,940,190
[45] Date of Patent: Aug. 17, 1999

[54] IMAGE IMPROVEMENT AFTER FACSIMILE RECEPTION

[75] Inventors: Gary Scott Overall; Phillip Byron Wright, both of Lexington, Ky.

[73] Assignee: Lexmark International, Inc., Lexington, Ky.

[21] Appl. No.: 08/110,190

[22] Filed: Aug. 23, 1993

[51] Int. Cl.$^6$ .............................. H04N 1/40; G06K 9/40
[52] U.S. Cl. ...................... 358/447; 358/445; 382/267
[58] Field of Search ................... 358/445, 447, 358/454, 463, 446; 382/54, 267; 348/607, 615; 345/136, 137, 141, 143, 144

[56] References Cited

U.S. PATENT DOCUMENTS

| | | | |
|---|---|---|---|
| 4,229,768 | 10/1980 | Kurahayashi et al. | 382/55 |
| 4,437,122 | 3/1984 | Walsh et al. | 358/166 |
| 4,450,483 | 5/1984 | Coviello | 358/166 |
| 4,517,604 | 5/1985 | Lasher et al. | 358/262 |
| 4,544,922 | 10/1985 | Watanabe et al. | 345/137 |
| 4,646,355 | 2/1987 | Petrick et al. | 382/54 |
| 4,780,711 | 10/1988 | Doumas | 340/728 |
| 4,918,523 | 4/1990 | Simon et al. | 358/133 |
| 4,975,785 | 12/1990 | Kantor | 353/447 |
| 5,060,082 | 10/1991 | Matsumoto et al. | 358/447 |
| 5,117,294 | 5/1992 | Yano | 358/447 |
| 5,151,794 | 9/1992 | Kumagai | 358/447 |
| 5,153,748 | 10/1992 | Moyer | 358/443 |
| 5,250,934 | 10/1993 | Denber et al. | 358/456 |

*Primary Examiner*—Madeleine Nguyen
*Attorney, Agent, or Firm*—John A. Brady

[57] ABSTRACT

A facsimile printer (1) in which sets of one or two pels contiguous to longer lines of such pels are reduced or eliminated. When reduced the smaller pels are positioned continuous to the longer line and are extended one pel on each side where the longer line exists. This reduces scanner errors and significantly improves images. Gray effects from dithering are not significantly effected when the pels are reduced and spread. When the image is graphic or otherwise more random than text scanned in the line and column direction, the correction may be deactivated.

18 Claims, 6 Drawing Sheets

IMAGE IMPROVEMENT AFTER FACSIMILE RECEPTION

TECHNICAL FIELD

This invention relates to the printing of images scanned at a distant location and transmitted over a communication link to a receiving printer, broadly termed facsimile. Such images are degraded by the scanning process. This invention relates to such applications in which the image is digitized as a bit map at least at the printing station. Such bit maps include bits of information which constitute errors introduced by the scanning.

BACKGROUND OF THE INVENTION

Facsimile systems are now well known, and this invention may be employed with any such system in which the final printing is defined by a bit map and in which the bit map may be modified before printing in accordance with this invention.

Modification of bit maps before printing is now well established, both for printers operating from highly accurate bit map data and for facsimile receivers. The modification is to eliminate the stairstep appearance of diagonal lines which results from printing which is applied to fill in certain bit locations and to leave the remaining bit locations entirely blank. Commercially, this modification is often described as enhancing the resolution of the printer. U.S. Pat. Nos. 4,437,122 to Walsh et al and 4,975,785 to Kantor are representative of such enhancement of resolution in printers. U.S. Pat. Nos. 5,060,082 to Matsumoto et al and 5,117,294 to Yano show such enhancement of resolution facsimile receivers.

This invention modifies the bit map of an image to correct errors. U.S. Pat. No. 4,646,355 to Petrick et al teaches modification of such a bit map to remove small dots and voids. U.S. Pat. No. 5,153,748 to Moyer is to the removal of gaps in such images. U.S. Pat. No. 5,151,794 to Kumagai teaches modification of such a bit map by determining a medium value for a group of pels.

DISCLOSURE OF THE INVENTION

In accordance with this invention, a facsimile printer which prints bit mapped images in resolutions typically at least generally as fine as about 203 horizontal by 98 vertical pels per inch is modified by logic which eliminates any one and two image pels in a horizontal or vertical line of text in which those pels are bounded by pels in an adjoining line which extends to at least one pel on either side of the one and two pels. Background (non-image) pels may be changed to image pels under the same criterion in applications where incorrect background pels are noticeable. Where the facsimile printer has the capability to print dots or slices spaced closer than the resolution of the bit map, preferably, instead of completely eliminating the one and two pels, they are treated as smaller pels contiguous to the image pels to which they adjoined in the bit map and, further, such smaller pels are preferably spread one pel on each side having image pels in the contiguous line.

To achieve this, a neighborhood of pels surrounding each pel is examined by suitable logic, as is common for enhancement of resolution. Accordingly, the foregoing logic can be incorporated into logic to enhance resolution, thereby avoiding a first operation to add or eliminate an image signal at a pel, which is then followed by a second operation in which that pel is modified or not to practice enhancement of resolution. Conversely, the foregoing logic may be independent of enhancement of resolution and is beneficially practiced in printing without enhancement of resolution. Absence of enhanced resolution in printing is less significant as a function of the fineness of resolution of the data bit map. Thus, where basic printing is at resolution finer than 600× 600 dots per inch, enhancement of resolution may not be important, but restoring or improving the bit map in accordance with this invention remains important.

This invention need not significantly interfere with accurate reproduction of dither patterns typically used to create shades of gray. Dither patterns are clusters of dots separated by background which the human eye integrates to perceive shades of gray. Such cluster patterns are not frequently those responded to by the criteria of this invention. Where pels are not removed but are made smaller and spread horizontally, the perceived gray is relatively unchanged because the surface area of the cluster is relatively unchanged.

The facsimile printer of this invention preferably can be brought to a second operating mode status under external control to disable this invention. This permits graphic data which may be in any form to be received and printed without modification and also permits the printer to act on data from internally stored fonts or other source which is considered highly accurate. Also, since this invention presumes scanning of the image received in the line and column direction of text, where scanning was at an angle, this invention can be disabled.

BRIEF DESCRIPTION OF THE DRAWING

The details of this invention will be described in connection with the accompanying drawing, in which.

BEST MODE FOR CARRYING OUT THE INVENTION

Figure 1:
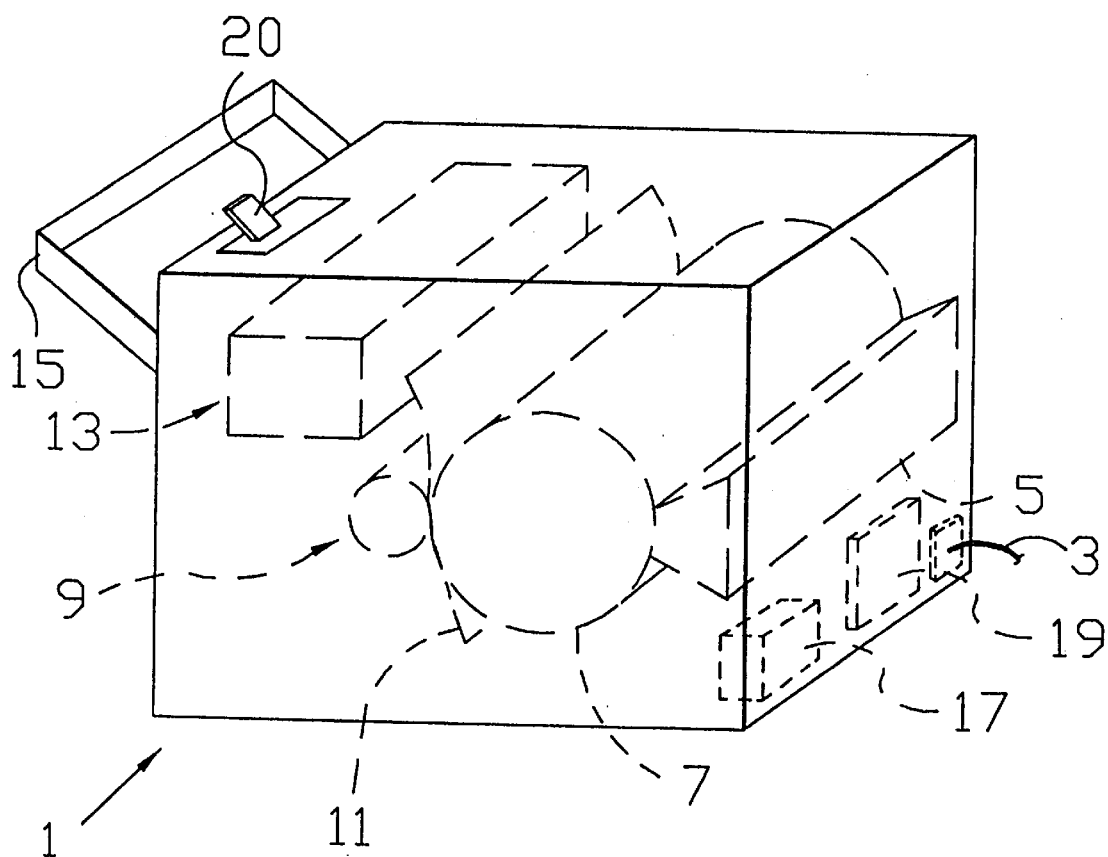
FIG. 1 is illustrative of a facsimile receiver in accordance with this invention.

Page information is received by the facsimile receiver 1 over a telephone line 3 or other communications link. Receiver 1 contains the imaging apparatus of any suitable printer. Preferably receiver 1 has printer capabilities to print from raster images by electrophotographic methods, as shown illustratively in FIG. 1, including an optical system 5 operative on photoconductor drum 7. Drum 7 transfers image defined by optical system 5 at transfer station 9 to paper 11. The image is fixed, typically by heat, at fixing station 13, and the finished printed page is delivered to output tray 15.

Data processor 17 in receiver 1 controls the printing operation as is now highly conventional in electronic printers. Information received on line 3, as well as information created internally, is stored electronically in memory 19 and accessed and used by data processor 17.

Data received by receiver 1 very commonly was created at a distant station by scanning a printed page or other imaged page with a scanner. The scanner typically is operated digitally in that it has small light sensors positioned to receive light from a given area of an image, corresponding in size to a data pel, the scanner is then rendered inactive, and moved one pel length and again activated. Scanners are often physically a line of such light sensors, with the output from each received being read out electronically as one line in a data bit map. The scanner very commonly traverses the image scanned oriented in the direction of a line of text and in the direction of a column of text.

Significant inaccuracies are interjected by such scanners since a sensor may be over an image area which is partially filled or may be influenced by the image characteristics of surrounding areas. In an extreme, illustrative case the sensor may be just one half over the start of a black image and the scanner may be designed to respond to 50% black. But, of course, the scanner is subject to variations from design within certain tolerances, as is all devices. The sensor may respond to the 50% black image as white, while the adjoining sensor, also over 50% black, responds as black. Similarly, surrounding areas may influence the scanner and a sensor theoretically over white may show black when near a corner formed by black image. As a scanner traverses text oriented to observe in lines parallel with lines of text and with columns of text, typical scanner errors are found to be one or two contiguous pels just prior to or just after a full line of pels. This is independent of resolution of the scanner.

Figure 2:
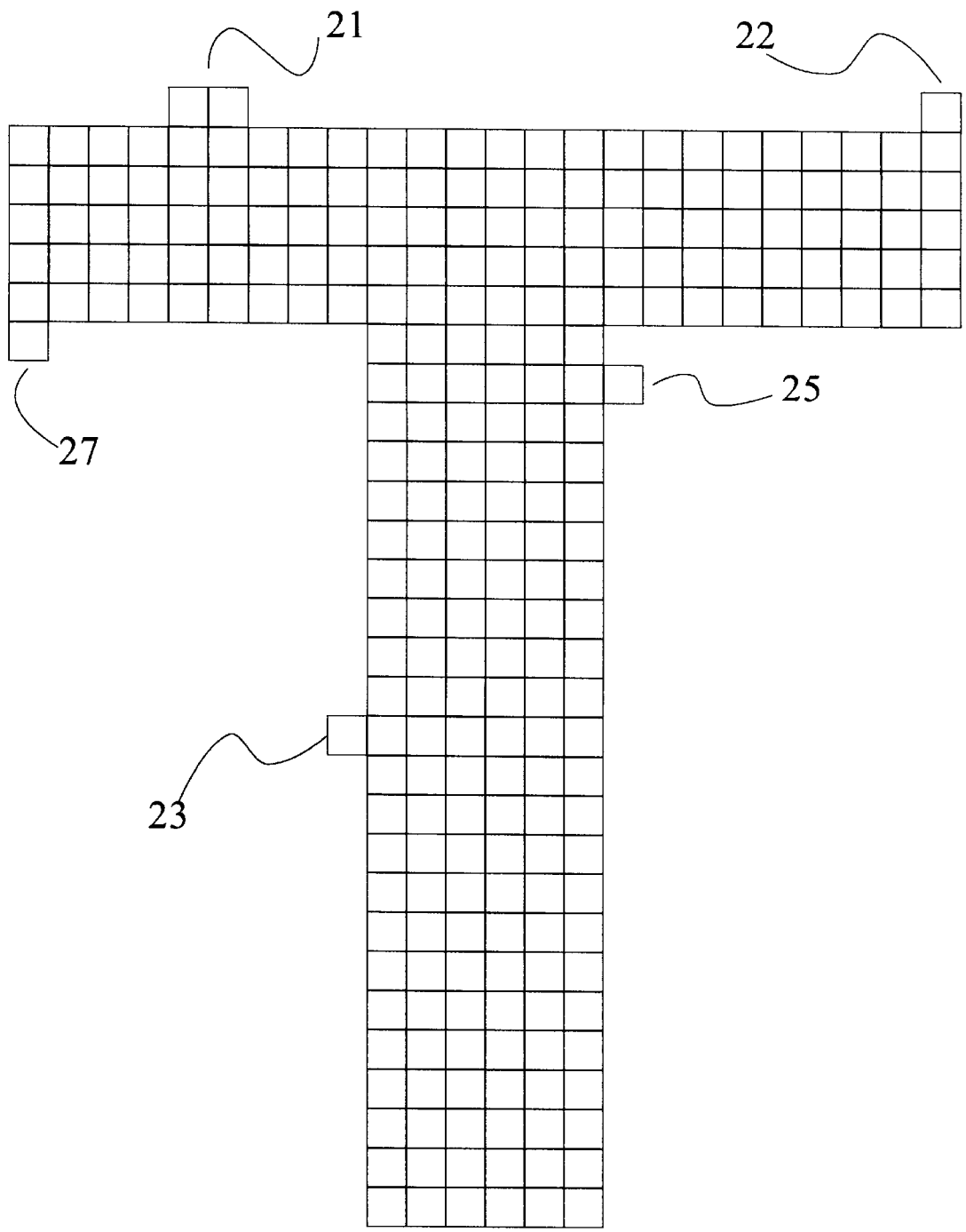
FIG. 2 is illustrative of a data bit map for the letter T having errors to be corrected.

Accordingly, the image data transmitted to receiver 1 may have a number of such errors. This data constitutes or is formed into a binary bit map in which a 1 or zero is assigned to each pel of an approximately 203 horizontal by 98 vertical dots per inch or finer resolution data bit map. The following discussion assumes a 200×200 dots per inch bit map as illustrative. The horizontal direction of the bit map is in the line direction of text and the vertical direction of the bit map is in the column direction of text. In accordance with this invention, this bit map is corrected to significantly improve text images printed. FIG. 2 illustrates the letter T for such a bit map with lines inside the T suggesting pels in a bit map. Corresponding memory locations for those pels would contain a binary 1 for each place shown as a square to indicate black (binary 1, as distinguished from binary zero, being arbitrarily assigned to imaged pels). The T has two contiguous pels 21 at the upper left in a horizontal line with white on each side and black below. The T has one pel 22 at the upper end of its cross with white on both sides and black below. The T has one pel 23 at the middle left in a vertical line with white on each side. The T has one pel 25 near the corner where the horizontal bar of the T crosses the vertical bar of the T which is contiguous to that vertical bar (this is a typical place for an error pel as the high percentage of surrounding black may influence the sensor; where such an error pel is at the junction of the black corner, this tends to slightly round the image and is tolerable). The T has one pel 27 at a lower end of its cross with white on both sides and black above.

In accordance with this invention the two pels 21 in the bit map are changed to 0 (for white) or reduced; the one pel 22 is changed to 0 (for white) or reduced; the one pel 23 in the bit map is changed to 0 (for white) or reduced, the one pel 25 is changed to 0 (for white) or reduced, and the one pel 27 is changed to 0 (for white) or reduced. Pels 21 are reduced or are changed to white because they are black pels in a horizontal line of two pels having black pels in the contiguous horizontal line which extends on either side of pels 21. Pel 22 is reduced or changed to white because it is contiguous with a horizontal line of black pels which extend on either side of pel 22. Pel 23 is reduced or changed to white because it is contiguous with a vertical line of black pels which extend on either side of pel 23. Pels 25 is reduced or changed to white because it is also contiguous with a vertical line of black pels which extend on either side of pel 25. Pel 27 is reduced or changed to white because it is contiguous with a horizontal line of black pels which extend on either side of pel 27.

Figure 3:
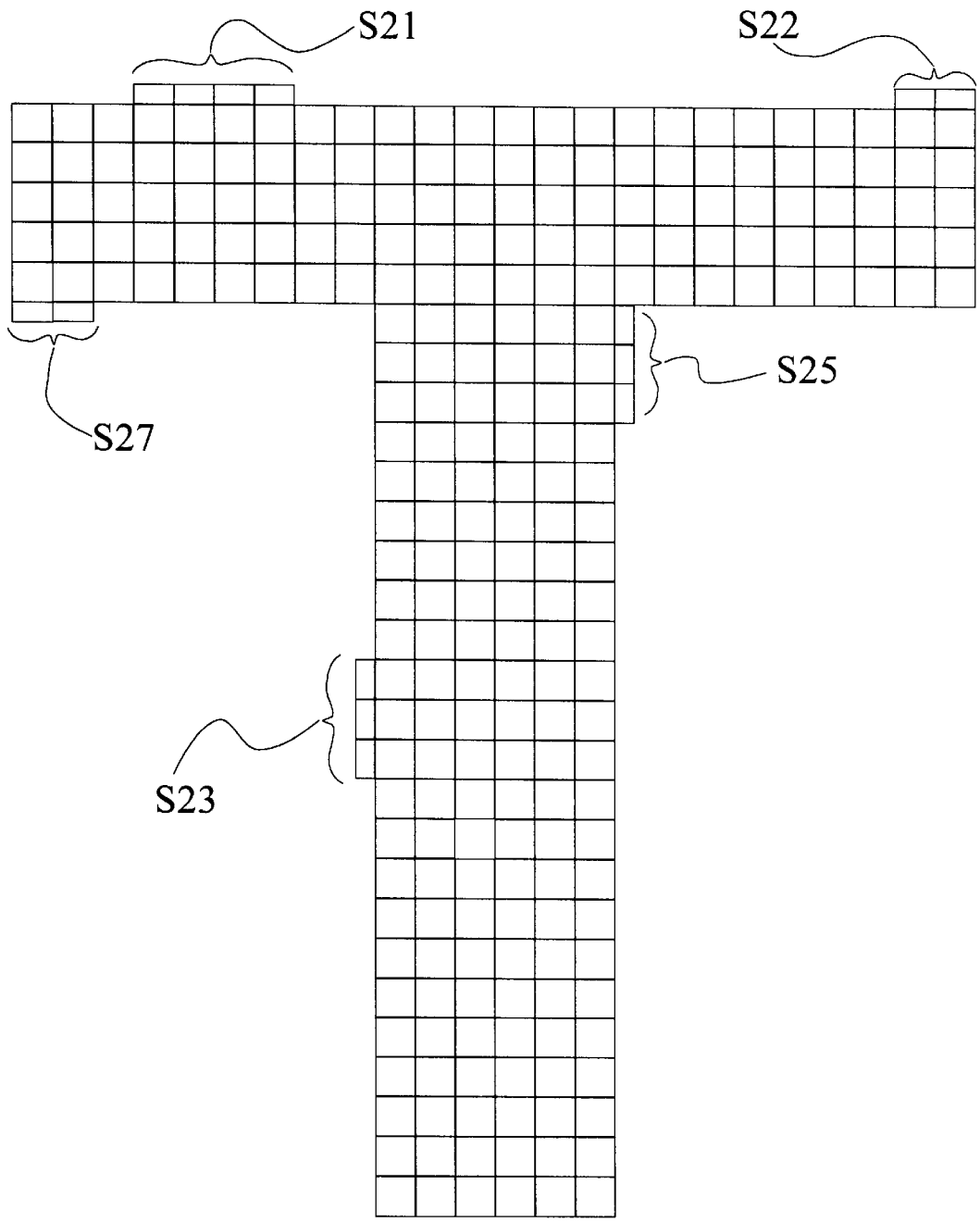
FIG. 3 is illustrative of the bit map of FIG. 2 when the correction is made by reducing and spreading the pels.

It will be noted that, where the pel is changed rather than reduced, this corrected pel map, which is used for printing, remains in 200 by 200 resolution. Reduction of the pels is preferred when receiver 1 can print in resolution finer than that of the pel map. In that circumstance the reduced pel is printed as a smaller pel (typically one-half full pel size), adjoining the contiguous line which is the basis for reducing the pel and, preferably, one one-half size pel is added on each side of the original pel or pels being changed where the adjoining line has an image pel. This is a recognition that the modified pels are created by the proximity of black during scanning so that printing black on the side toward black may be more accurate than changing the pel to white. FIG. 3 is illustrative of such changes for the bit map of FIG. 2, with the "spread" pel having the number of the pel or pels upon which they are based preceded by "S". (Thus, the set 21 of two pels is the basis for set S21 of four half-size pels).

If the printing mechanism of receiver 1 has enhancement of resolution, the actual printing for each pel may be modified to print in subareas of the full pel. That further improves image quality, but that is in addition to and not required for the improvement of image achieved by the correction of bit map errors as just described.

Letters in text not having horizontal or vertical lines normally have few errors from scanning. Accordingly, the criterion of this invention does not involve diagonal lines.

FIGS. 4–14 illustrate the neighborhood of pels examined to determine that the center pel should be changed in accordance with this invention. The X's signify "Don't Care" in the logic of this invention. The pels are stored in memory 19 under control of data processor 17 so that the content of all contiguous pels to the center pel is readily accessed. Although only a 5 by 5 pel neighborhood is needed to practice the preferred embodiment of this invention, a 9 by 9 neighborhood is shown since this neighborhood is examined for enhancement of resolution. FIGS. 4–9 are directed to the two pels 21 being changed or reduced.

Enhancement of resolution techniques would not eliminate or drastically reduce pels 21. Although enhancement of resolution might modify the pels 21 and adjoining white pels to smooth the abrupt, stairstep appearance, it would be expected to ignore pels 22, 23, 25 and 27 of FIG. 2 since they might constitute fine detail such as serifs on small characters.

The two black pels 21 are reduced or changed to white in accordance with this invention in sequence as each of the two pels 21 becomes the center pel (circled in FIGS. 4–9) in the neighborhood as illustrated in FIGS. 4–9. Although data processor 17 can be programmed to perform this function, preferably this is done by combinational logic (not shown) driven by data processor 17 as that is much faster. Such logic incorporates both the correction of error pels in accordance with this invention and the enhancement or resolution where that is also performed. The logic is simply built to provide the enhancement output which would occur if the center pel were originally of the black or white status to which it is conceptually corrected in accordance with this invention.

Figure 4:
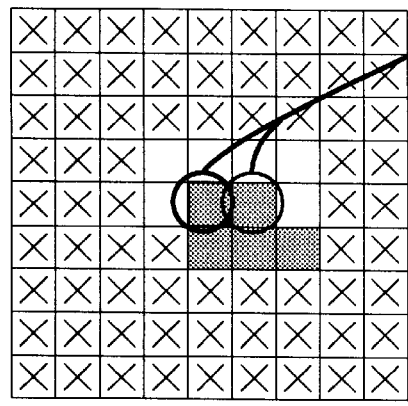
FIGS. 4–9 are illustrative of the neighborhoods for which examination results in a set of two image pels being changed to white pels or reduced to one-half size with contiguous pels being added at one-half size.

Enhancement of resolution will not be disclosed in detail. It is now found in commercial printers and shown in various patents and publications, several of which are cited under the heading "Background of this Invention" and forms no necessary part of this invention. Since the criterion of this invention involves only a few configurations, it may be readily incorporated into the logic used for enhancement of resolution.

Where the pattern applied to FIG. 4 is the same as logic shown in FIG. 4, a one-pel output buffer for optical system 5 has written to it the modulation required to achieve a one-half size pel if the mode is to reduce the pels. (If the mode is to eliminate black pels, the modulation would be that to write white). The pel significance in the memory applied to the neighborhood logic is not changed as the pels advance through different positions.

Figure 5:
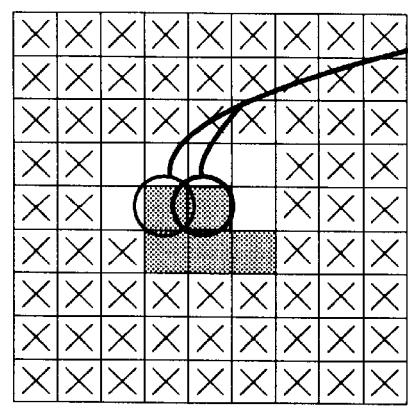

The pel neighborhood is then advanced right to left by one pel. FIG. 5 shows logic which detects the pattern. In response to this logic the output buffer has for the new center pel of pels 21 modulation for one-half size pel or white pel written to it.

Figure 6:
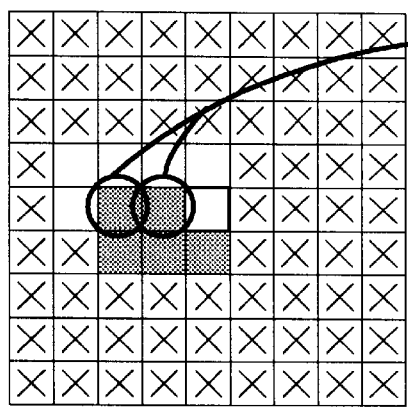

The pel neighborhood is then advanced right to left by one pel. FIG. 6 shows the logic which detects this pattern. If the mode is to eliminate black pels, the FIG. 6 logic is not incorporated into the overall logic. In the reduce and spread mode, in response to this logic the output buffer has for the new center pel, which is immediately next to pels 21, the modulation for a one-half size pel written to it.

Figure 7:
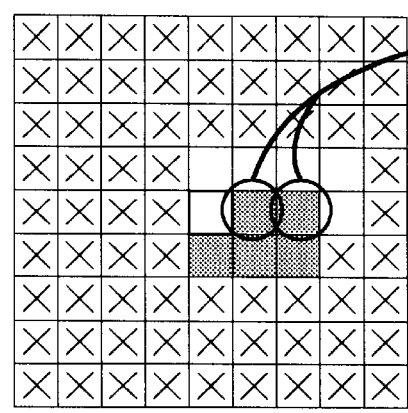

The FIG. 7 logic is not used if the mode is to eliminate black pels. FIG. 7 shows the two bit patterns of pels 21 as it appears in the neighborhood logic immediately before that shown in FIG. 4 and the logic which detects this pattern. In the reduce and spread mode, in response to this logic the output buffer has for the center pel, which is immediately prior to pels 21, the modulation for a one-half size pel written to it.

Figure 8:
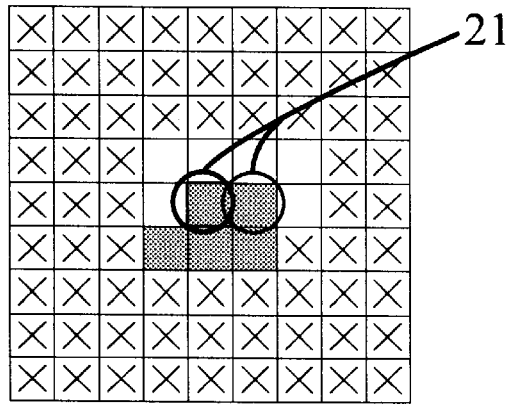

FIG. 8 shows logic employed which achieves the same result as FIG. 4 with respect to pels 21, but which is required where the two pels are above the last two pels on the right end of a longer horizontal line.

Figure 9:
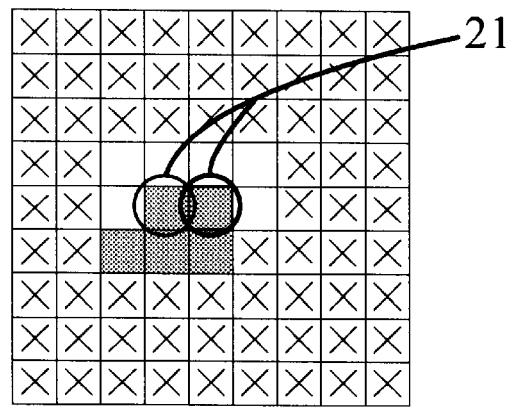

FIG. 9 shows logic employed which achieves the same result as FIG. 5 with respect to pels 21, but which is also required where the two pels are above the right last two pels on a longer horizontal line.

Figure 10:
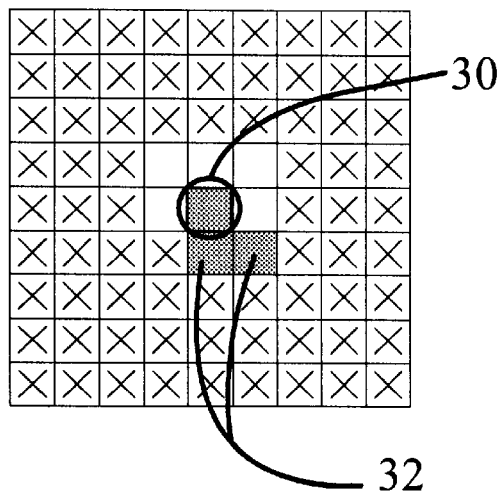
FIGS. 10–13 are illustrative of the neighborhoods for which examination results in a single image pel being changed to a white pel or reduced to one-half size with contiguous pels being added at one-half size.

FIGS. 10–13 illustrate a neighborhood for examination as described with respect to FIGS. 4–9 in which a single black pel 30 is changed because it has white on both sides and is contiguous to a line of two black pels 32.

Where the pattern applied to FIG. 10 is the same as the logic shown in FIG. 10, the output buffer for the center pel 30 has written to it one-half size pel modulation if the mode is to reduce the pels or white modulation if the mode is to eliminate black. The pel significance in the memory applied to the neighborhood logic is not changed as the pels advance through different positions.

Figure 11:
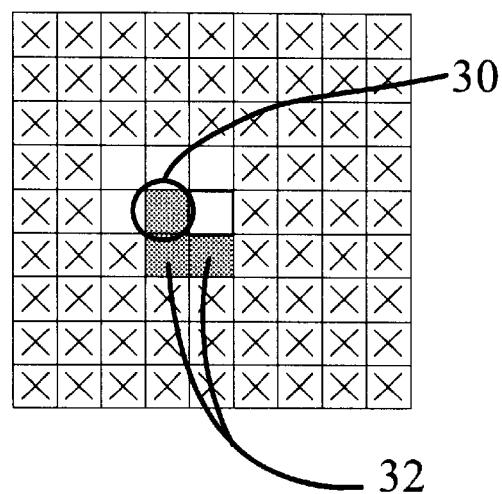

The pel neighborhood is then advanced right to left by one pel. FIG. 11 shows the new pattern applied and the logic which detects this pattern. If the mode is to eliminate black pels, the FIG. 11 logic is not incorporated into the overall logic. In the reduce and spread mode, in response to this logic the output buffer has for the new center pel, which is immediately next to pel 30, the modulation for a one-half size pel is written to it.

Figure 12:
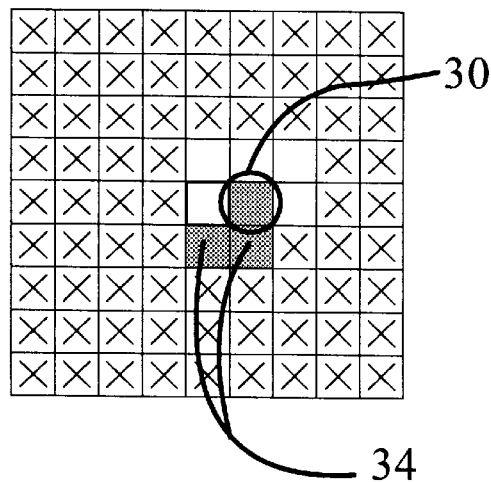

The FIG. 12 logic is not used if the mode is to eliminate black pels. FIG. 12 shows the bit 30 as it appears when there are black pels 34 at its left and below, and the logic which detects this pattern. In the reduce and spread mode, in response to this logic the output buffer has for the center pel, which is immediately prior to pel 30, modulation for a one-half size pel written to it.

Figure 13:
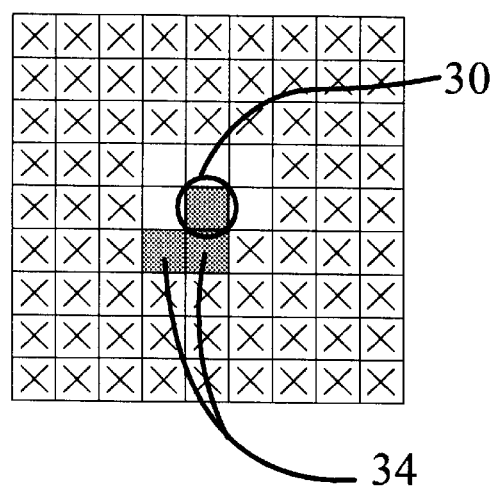

FIG. 13 shows logic employed to detect a single pel above the last pel on right of the longer lower line of pels 34 (similarly, the FIG. 10 logic detected such a pel when it is above the last pel on the left of a longer line of pels 32.)

Figure 14:
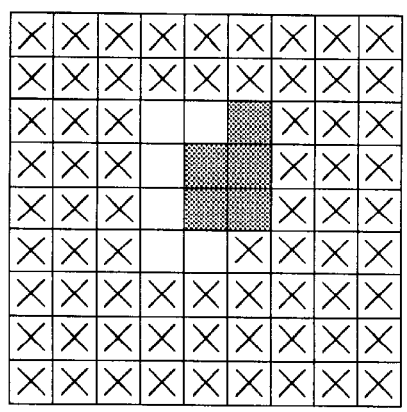
FIG. 14 shows as example of logic directly similar for vertical lines.

FIG. 14 shows logic to detect a set of two pels on the left in vertical configuration. The FIG. 14 logic is identical to that of FIG. 4 rotated 90 degrees. The logic for error pels on the left and right side of vertical lines and on the bottom of horizontal line and on the bottom of horizontal line are direct rotations of the logic shown and therefore are not further illustrated.

The pel map moves through the neighborhood from right to left as described, so information for vertically adjoining pels is not read to the output buffer until after the amount of pels constituting a full line have been sent to the output buffer. This, however, does not influence the logic of this invention as described.

In the reduce and spread mode, the printing mechanism prints at twice the resolution of the bit map. Alternatively, printing of reduced pels can be achieved by modulation where the optical system 5 can print in segments capable of control to print multiple dots or slices in one pel area. In the vertical implementation at twice the resolution a one-half width dot adjoining the next black dot is written in the two corresponding lines of the output buffer. To achieve this, the bit information is passed through the neighborhood logic twice. In the horizontal implementation at twice the resolution a one-half height dot is written in the line adjoining the next black dot and a white dot is written in the other of the two corresponding lines of the output buffer. (Thus, in the FIGS. 4–9 implementation, the higher line receives white modulation and the lower line receives black modulation.) To achieve this, the bit information is passed through the neighborhood logic twice. (Where the printing is at the same resolution, a single pass through the neighborhood logic is required and each bit is modulated to achieve the visual effect of the desired size. A very thin slice in the middle of a pel can give the visual effect of a reduced-size pel in the horizontal direction.)

Figure 15:
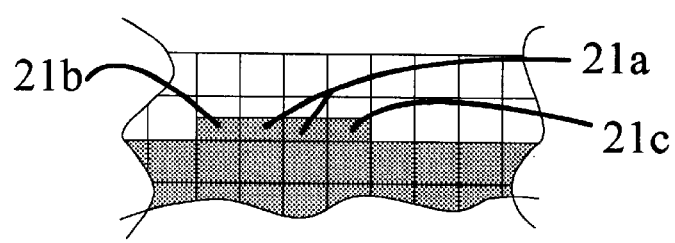
FIG. 15 is illustrative of the reduction and spreading, rather than the elimination, of changed image pels.

FIGS. 15 is illustrative of the pels 21 as printed being reduced and spread rather than changed to white. In FIG. 15 the locations of the original pels 21 is labeled 21a to indicate the reduced size, the reduced pel added on one side is labeled 21b and the pel added on the other side is labeled 21c. These are the final pels as printed and are not changed by any contemplated resolution enhancement.

White pels can be changed or reduced according to the same criterion as black pels, with "lines" in the criterion being lines of white pels. However, this is not generally important for white pels since black or other imaging material spreads somewhat during application and is generally more apparent than the background color.

Either by operation of a control panel switch 20 (FIG. 1) or by control codes in the data received on line 3, the facsimile receiver 1 has the capability of disabling this invention (such disabling would be by a single logical entry into the combinational logic discussed; the status of receiver 1 is still one which prints based on the bit map, which in this status is not corrected in accordance with this invention). When disabled, graphic information received on line 3 which is expected to have angles not found in textual characters can be directly responded to. Also, receiver 1 can print from internal data known to be accurate, such as stored fonts, or otherwise print as a local printer rather than from data received from a distant station on line 3. This invention may be disabled also when material received has been scanned on a diagonal rather than in the line and column directions of text in the material. This invention need not necessarily be disabled to protect dither patterns as dither patterns do not closely correspond to the criterion of this invention. When the reduced and spread modification is employed, virtually all dither gray levels are substantially preserved.

Where the receiver 1 operates in much finer resolution, such as 600 by 600 dots per inch, correction criterion need not be changed, since scanning errors are still typically in groups of one and two pels.

Modification within the spirit and scope of this invention can be anticipated.

What is claimed is:

1. An imaging apparatus to receive image data subject to degradation and produce a visual image based on said image data, said apparatus comprising means to receive said image from a distant point, means to examine a bit map of said data in resolution of at least as fine as about 203 by 98 dots per inch, said bit map having lines corresponding to lines of text and lines corresponding to columns of text, means to correct said bit map in response to the content of said means to examine, said means to correct replacing substantially all sets of one or two contiguous pels, both of either image or background significance, with pels of the other significance or reducing said sets in the same significance:

when said sets are in a horizontal line and contiguous to a horizontal line of pels of the same significance extending at least one pel on either side of said set, said reduced pels being located substantially contiguous to said horizontal line to which said set is contiguous, and when said sets are in a vertical line and contiguous to a vertical line of pels of the same significance extending at least one pel on either side of said set, said reduced pels being located substantially contiguous to said vertical line to which said set is contiguous, and means to produce said visual image from said corrected bit map, and control means to bring said imaging apparatus to a first status in which said visual image is produced from said corrected bit map and to bring said imaging apparatus to a second status in which said visual image is produced from said bit map not corrected by said means to correct.

2. The imaging apparatus as in claim 1 in which substantially all of said pels which are replaced or reduced are reduced and one such reduced pel is added on at least one side of said reduced pels contiguous to the line to which said set is contiguous.

3. An imaging apparatus to receive image data subject to degradation and produce a visual image based on said image data, said apparatus comprising means to examine a bit map of said data in resolution of at least as fine as about 203 by 98 dots per inch, said bit map having lines corresponding to lines of text and lines corresponding to columns of text, means to correct said bit map in response to the content of said means to examine, said means to correct replacing substantially all sets of one or two contiguous pels, both of either image or background significance, with pels of the other significance or reducing said sets in the same significance:

when said sets are in a horizontal line and contiguous to a horizontal line of pels of the same significance extending at least one pel on either side of said set, said reduced pels being located substantially contiguous to said horizontal line to which said set is contiguous, and when said sets are in a vertical line and contiguous to a vertical line of pels of the same significance extending at least one pel on either side of said set, said reduced pels being located substantially contiguous to said vertical line to which said set is contiguous, and means to produce said visual image from said corrected bit map, and control means to bring said imaging apparatus to a first status in which said visual image is produced from said corrected bit map and to bring said imaging apparatus to a second status in which said visual image is produced from said bit map not corrected by said means to correct.

4. The imaging apparatus as in claim 3 in which substantially all of said pels which are replaced or reduced are reduced and one such reduced pel is added on at least one side of said reduced pels contiguous to the line to which said set is contiguous.

5. An imaging apparatus to receive image data subject to degradation and produce a visual image based on said image data, said apparatus comprising means to examine a bit map of said data in resolution of at least as fine as about 203 by 98 dots per inch, said bit map having lines corresponding to lines of text and lines corresponding to columns of text, means to correct said bit map in response to the content of said means to examine, said means to correct reducing substantially all sets of one or two contiguous pels, both of either image or background significance, said sets being reduced in the same significance:

when said sets are in a horizontal line and contiguous to a horizontal line of pels of the same significance extending at least one pel on either side of said set, said reduced pels being located substantially contiguous to said horizontal line to which said set is contiguous, and when said sets are in a vertical line and contiguous to a vertical line of pels of the same significance extending at least one pel on either side of said set, said reduced pels being located substantially contiguous to said vertical line to which said set is contiguous, and one such reduced pel is added on at least one side of said reduced pels contiguous to the line to which said set is contiguous, and means to produce said visual image from said corrected bit map.

6. The imaging apparatus as in claim 5 in which said imaging apparatus comprises means to receive said image data from a distant point.

7. An imaging apparatus to receive digitally scanned image data and produce a visual image based on said image data, said apparatus comprising means to examine a bit map of said data, said bit map having lines corresponding to lines of text and lines corresponding to columns of text, means to correct said bit map in response to the content of said means to examine, said means to correct reducing substantially all sets of one or two contiguous pels, both of either image or background significance:

when said sets are in a horizontal line and contiguous to a horizontal line of pels of the same significance extending at least one pel on either side of said set, said reduced pels being located substantially contiguous to said horizontal line to which said set is contiguous, and when said sets are in a vertical line and contiguous to a vertical line of pels of the same significance extending at least one pel on either side of said set, said reduced pels being located substantially contiguous to said vertical line to which said set is contiguous, and means to produce said visual image from said corrected bit map.

8. The imaging apparatus as in claim 7 also comprising control means to bring said imaging apparatus to a first status in which said visual image is produced from said corrected bit map and to bring said imaging apparatus to a second status in which said visual image is produced from said bit map not corrected by said means to correct.

9. The imaging apparatus as in claim 8 in which one such reduced pel is added on at least one side of said reduced pels contiguous to said line to which said set is contiguous.

10. The imaging apparatus as in claim 8 in which one such reduced pel is added on at least one side of said reduced pels contiguous to said line to which said set is contiguous.

11. An imaging apparatus to receive image data subject to degradation and produce a visual image based on said image data, said apparatus comprising means to examine a bit map of said data in resolution of at least as fine as about 203 by 98 dots per inch, said bit map having lines corresponding to lines of text and lines corresponding to columns of text, means to correct said bit map in response to the content of said means to examine, said means to correct replacing substantially all sets of one pel and substantially all sets of two contiguous pels, both of either image or background significance, with pels of the other significance or reducing said sets in the same significance:

when said sets are in a horizontal line and contiguous to a horizontal line of pels of the same significance extending at least one pel on either side of said set, said reduced pels being located substantially contiguous to said horizontal line to which said set is contiguous, and when said sets are in a vertical line and contiguous to a vertical line of pels of the same significance extending at least one pel on either side of said set, said reduced pels being located substantially contiguous to said vertical line to which said set is contiguous, and means to produce said visual image from said corrected bit map.

12. The imaging apparatus as in claim 11 in which said imaging apparatus comprises means to receive said image data from a facsimile machine located at a distant point.

13. The imaging apparatus as in claim 12 also comprising control means to bring said imaging apparatus to a first status in which said visual image is produced from said corrected big map and to bring said imaging apparatus to a second status in which said visual image is produced from said bit map not corrected by said means to correct.

14. The imaging apparatus as in claim 13 in which substantially all of said pels which are replaced or reduced are reduced and one such reduced pel is added on at least one side of said reduced pels contiguous to the line to which said set is contiguous.

15. The imaging apparatus as in claim 12 in which substantially all of said pels which are replaced or reduced are reduced and one such reduced pel is added on at least one side of said reduced pels contiguous to the line to which said set is contiguous.

16. The imaging apparatus as in claim 11 also comprising control means to bring said imaging apparatus to a first status in which said visual image is produced from said corrected big map and to bring said imaging apparatus to a second status in which said visual image is produced from said bit map not corrected by said means to correct.

17. The imaging apparatus as in claim 16 in which substantially all of said pels which are replaced or reduced are reduced and one such reduced pel is added on at least one side of said reduced pels contiguous to the line to which said set is contiguous.

18. The imaging apparatus as in claim 11 in which substantially all of said pels which are replaced or reduced are reduced and one such reduced pel is added on at least one side of said reduced pels contiguous to the line to which said set is contiguous.

* * * * *